United States Patent [19]

Tofin et al.

[11] Patent Number: 5,447,274

[45] Date of Patent: Sep. 5, 1995

[54] PORTABLE IRRIGATION APPARATUS USING PUMPED OR DIRECT WATER

[75] Inventors: Dennis Tofin; Darcy Tofin; Paris Tofin, all of Outlook, Canada

[73] Assignee: Central Irrigation Company Ltd., Outlook, Canada

[21] Appl. No.: 186,998

[22] Filed: Jan. 27, 1994

[30] Foreign Application Priority Data

Jan. 27, 1993 [CA] Canada .................. 2088221

[51] Int. Cl.⁶ .................. B05B 3/18; A01G 25/09
[52] U.S. Cl. .................. 239/724; 239/723
[58] Field of Search .................. 239/722, 723, 724; 169/13, 24, 52

[56] References Cited

U.S. PATENT DOCUMENTS

| | | | |
|---|---|---|---|
| 608,192 | 8/1898 | Glazier et al. | 239/722 X |
| 2,243,610 | 5/1941 | Spreng | 239/722 |
| 2,360,777 | 10/1944 | La Bour | 169/24 X |
| 2,367,032 | 1/1945 | La Bour | 169/24 X |
| 2,694,455 | 11/1954 | Eickmeyer | 169/24 |
| 2,798,435 | 7/1957 | Armstrong | 239/722 X |
| 2,851,305 | 9/1958 | Martinez | 239/724 |
| 3,472,456 | 10/1969 | Strong | 239/723 |
| 4,858,832 | 8/1989 | Hundeby | 239/723 |
| 4,865,255 | 9/1989 | Luvisotto | 239/722 |

FOREIGN PATENT DOCUMENTS 826085  4/1981  U.S.S.R. .................. 239/724

*Primary Examiner*—William Grant
*Attorney, Agent, or Firm*—Murray E. Thrift; Adrian D. Battison; Stanley G. Ade

[57] ABSTRACT

An irrigation apparatus for parks, golf courses, acreages, sports fields, school yards, etc., is mounted on a small trailer. It includes a sprayer head of the impulse type, a self-priming centrifugal pump for supplying water under pressure to the sprayer head and an engine for driving the pump. A hose carried by the trailer is connected to the pump inlet and may be used to supply water to the pump from a lake, stream or a water line. Where a pressurized water supply is available, the pump may be used to boost the pressure and provide improved coverage and a better misting action. If the existing pressure is high enough, it can be connected to a direct inlet to the sprayer.

3 Claims, 3 Drawing Sheets

5,447,274

PORTABLE IRRIGATION APPARATUS USING PUMPED OR DIRECT WATER

FIELD OF THE INVENTION

The present invention relates to irrigation and more particularly to a portable sprinkler irrigator.

BACKGROUND

In the irrigation of parks, golf courses, acreages, sports fields, school yards and other irrigation applications, it is common to use relatively small, low pressure sprinklers that are manually set out in a labor intensive operation. Large numbers of sprinklers and hoses and an extensive pressurized water supply are required to cover large areas. An alternative is an expensive, inground sprinkler system.

The objective of the present invention is to provide a novel apparatus for irrigating such areas that reduces equipment requirements, manpower requirements or both.

SUMMARY

According to the present invention there is provided an irrigation apparatus comprising:

a portable platform;

an irrigation sprayer means mounted on the platform for spraying water therefrom;

pump means mounted on the platform for pumping water to the sprayer means; and engine means mounted on the platform and connected to the pump for driving the pump.

The platform is preferably a small trailer unit of a size that can be towed behind a vehicle, for example a garden tractor or a golf cart. The preferred embodiment of the invention has a self-priming pump with a suction inlet that may draw water from an unpressurized water source. The pump may also be connected to a pressurized source and used to boost the water pressure. Because it is pump driven, the sprayer may be a high pressure sprayer delivering a large volume over a long range. Consequently, a single set-up is sufficient to irrigate a much larger area than is possible with a relatively low pressure, manually placed sprinkler. Extensive water supplies are unnecessary. By boosting the water pressure to the sprayer, the sprayer tends to form a mist rather than large water droplets, A mist is preferred because it eliminates damage to plants and the compaction of soil.

Where desired, a direct supply coupling for delivering pressurized water directly to the sprayer can be provided so that supplies of water at acceptable pressures can be used directly where available.

Preferred embodiments of the invention can be used to irrigate oddshaped fields or hard to get at areas. They may be used for pumping out areas flooded by heavy rains or spring run-off. They can be mounted on small trailers for convenient operation by one operator.

BRIEF DESCRIPTION OF THE DRAWINGS

In the accompanying drawings, which illustrate an exemplary embodiment of the present invention.

DETAILED DESCRIPTION

Figure 1:
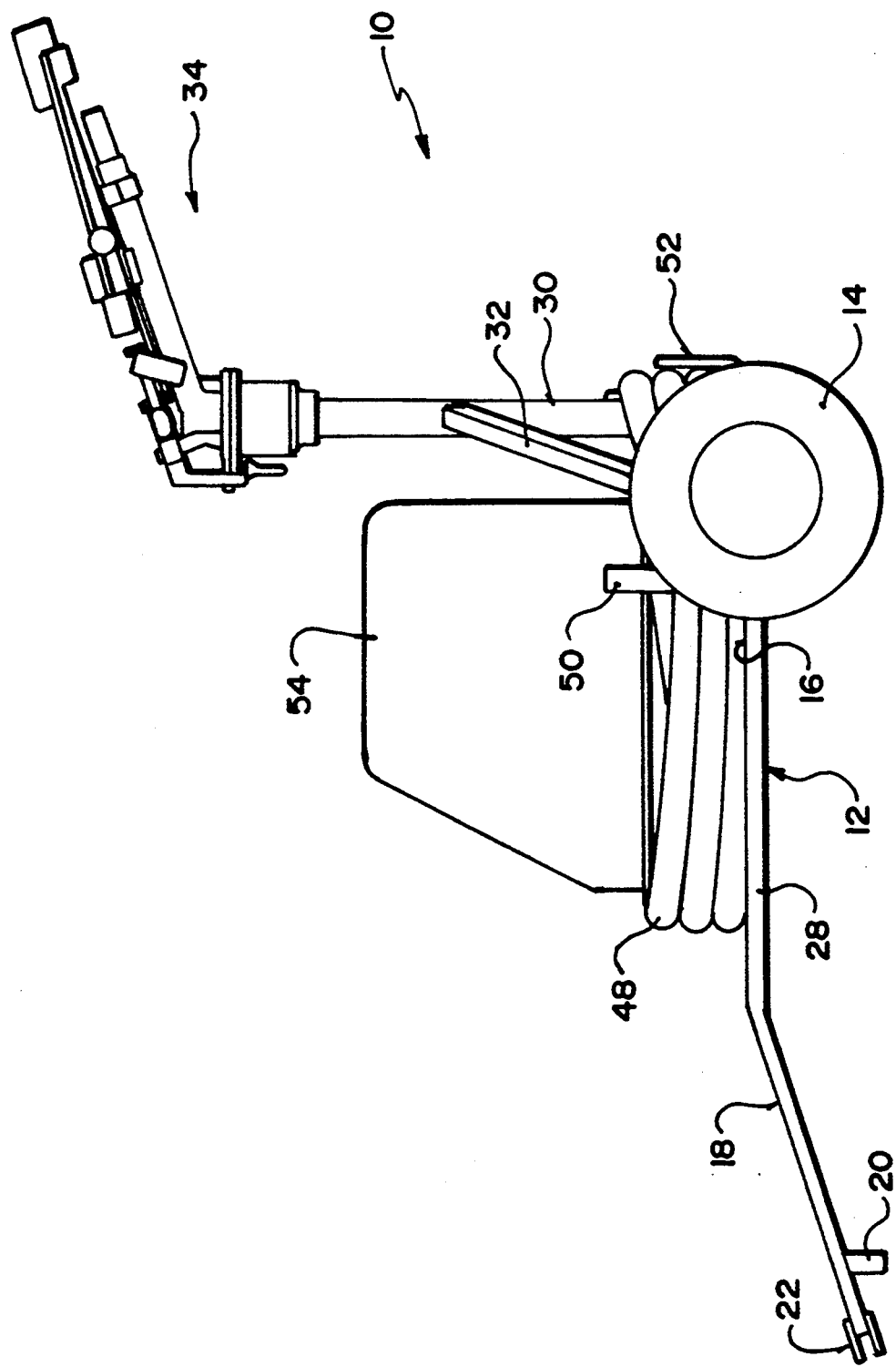
FIG. 1 is a side elevation of the apparatus prepared for transportation.

Referring to the accompanying drawings, there is illustrated an irrigating apparatus 10 including a trailer 12 having two wheels 14 on opposite sides of the trailer at the trailing end and a platform 16. A tongue 18 projects from the front of the trailer and carries a ground support 20 for supporting the platform in a horizontal position when the support engages the ground. A towing hitch 22 is connected to the leading end of the tongue.

The trailer platform 16 has a triangular frame with a transverse back member 26 and two forwardly converging side members 28. Various cross members are carried by the back member and the side members and serve for mounting a motor and pump unit and a cover for the motor and pump.

At the rear of the trailer is a stand pipe 30. This is mounted on a support structure 31 and is held in place by two angle braces 32 extending from the stand pipe to the rear cross member 26 of the trailer frame.

The upper end of the stand pipe carries a sprayer head 34. This is in the form of an impulse type spray nozzle that can be programmed to spray a complete circle or any part thereof. Nozzles of this type are known and consequently the nozzle will not be described in greater detail.

At the bottom of the stand pipe is a direct inlet hose 36 leading through the stand pipe to the sprinkler head 34. This is normally closed with a gate valve 38. Part way along the stand pipe, it has a pump inlet 40 connected through a check valve 42 to the outlet of a centrifugal, self-priming pump 44. The pump is driven by an internal combustion engine 46.

The pump and the motor are mounted as a unit on the platform of the trailer 12. The pump has an inlet 47 normally connected to a hose 48. The hose may be used for drawing water from any convenient source of water, for example a pond or stream, or, where available, a pressurized water pipe. Where a pressurized water pipe is available, the pump will boost the pressure to the sprayer in order to provide a higher pressure, larger volume spray with a more satisfactory mist-like consistency than would be the case with a conventional pressurized water supply.

Where the pressure of the pressurized water supply is sufficiently high, the hose may be disconnected from the pump inlet 47 and connected to the direct inlet 36 to the sprayer. Opening of the gate valve 38 admits the pressurized water supply to the sprayer, while the check valve 42 prevents escape of the water back to the pump.

Figure 2:
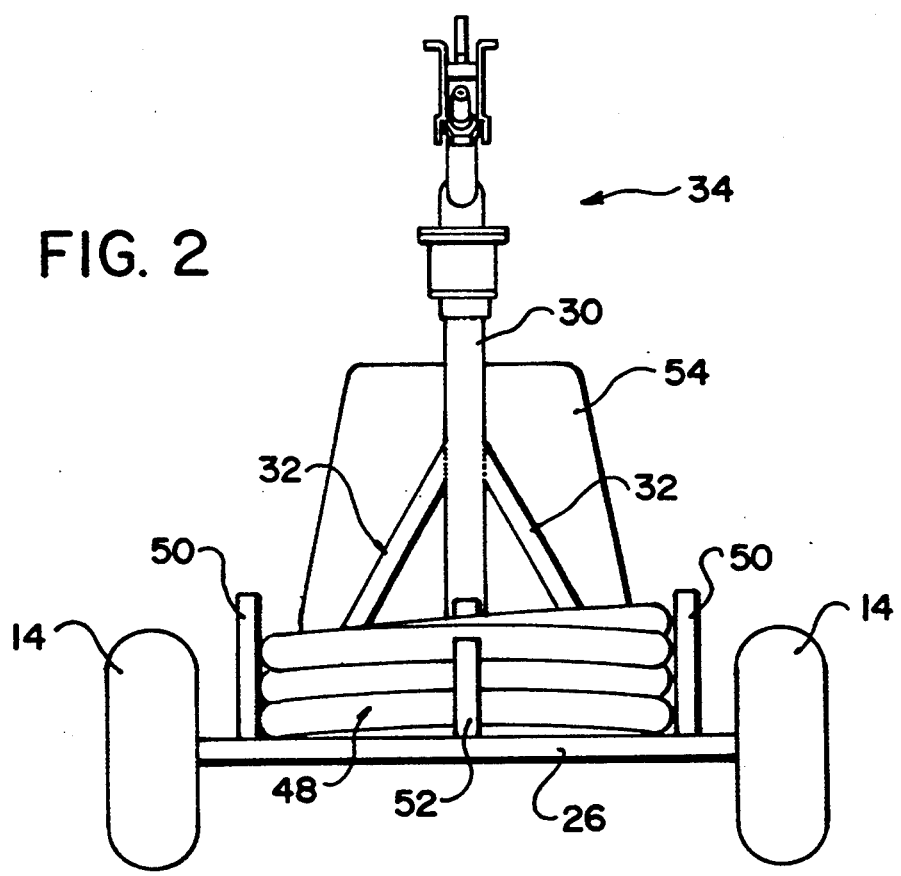
FIG. 2 is a rear elevation of the apparatus as shown in FIG. 1.
Figure 3:
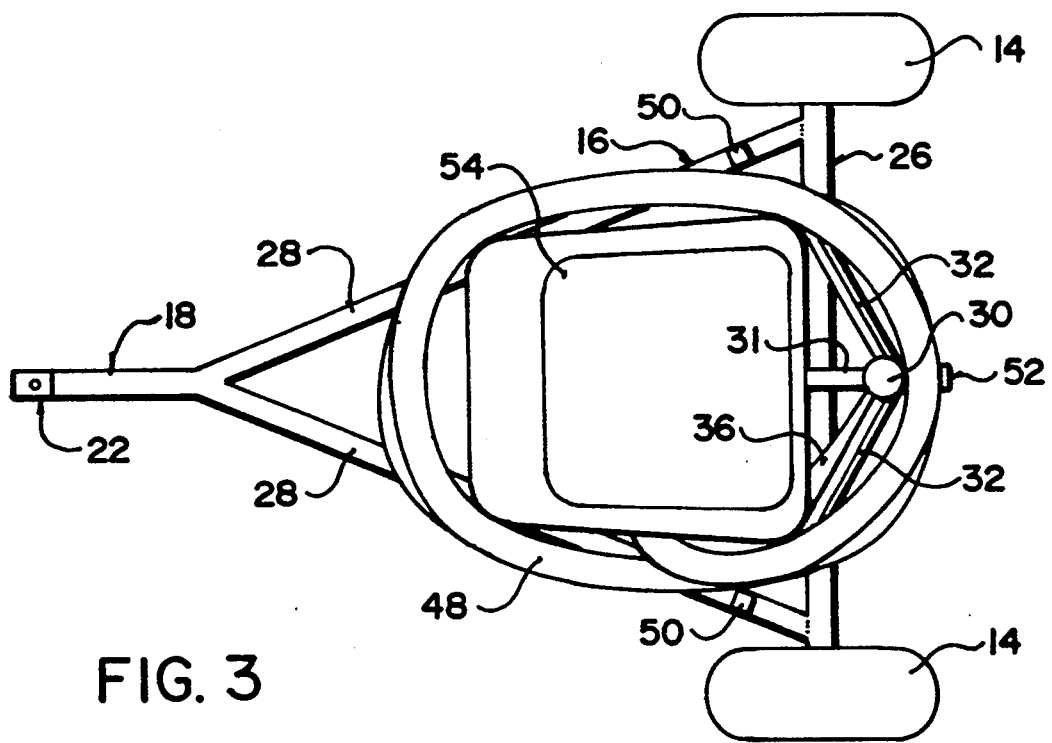
FIG. 3 is a plan view of the apparatus as shown in FIG. 1.
Figure 5:
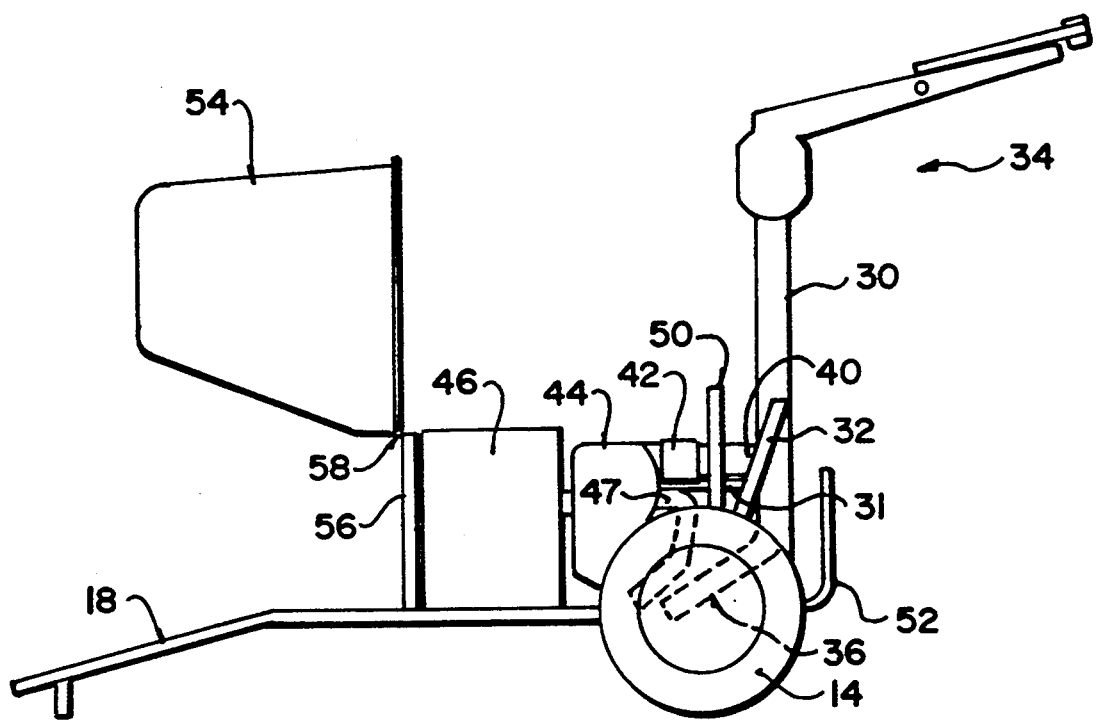
FIG. 5 is a side elevation view of the apparatus with the cover open.
Figure 4:
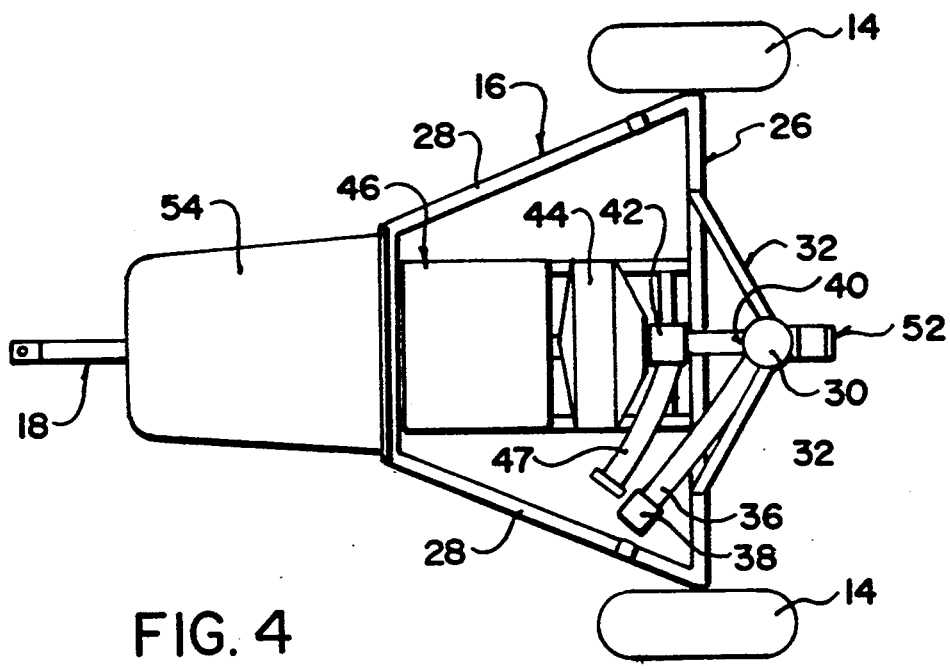
FIG. 4 is a plan view of the apparatus with the engine and pump cover open.

When arranged for transport, as illustrated in FIGS. 1, 2 and 3, the hose 48 is wrapped around the outside of the trailer, inside two hose supports 50 projecting upwardly from the sides of the trailer, near the rear. The hose is captured on a hook 52 mounted on the backside of the stand pipe 30.

Also as illustrated in FIGS. 1, 2 and 3, the apparatus is provided with a motor and pump cover 54 that seats over the motor and pump to protect them from excessive water spray. The cover is supported in position by the stand pipe support structure 31 at the rear of the trailer and by a cover support 56 in front of the motor 46. The cover is mounted on the support 56 by a hinge 58 so that it can pivot upwardly to the front to expose the engine and pump so that they can be used or serviced.

While one particular embodiment of the present invention has been described in the foregoing, it is to be understood that other embodiments are possible within the scope of the invention. The invention is to be considered limited solely by the scope of the appended claims.

We claim:

1. An irrigation apparatus comprising:

a portable platform;

irrigation sprayer means having a sprayer water inlet, the sprayer means being mounted on the platform for spraying water therefrom in response to the receipt of pressurized water at the sprayer water inlet;

pump means mounted on the platform, the pump means having a suction inlet and a pressurized water outlet and comprising means for increasing the pressure of water received at the suction inlet and delivering the water under increased pressure to the pressurized water outlet;

pressurized water delivery means for delivering pressurized water from the pressurized water outlet of the pump means to the sprayer water inlet;

direct water inlet means for receiving pressurized water from a source thereof independent of the pump means and delivering the pressurized water so received directly to the sprayer water inlet;

a check valve in the pressurized water delivery means for preventing flow from the direct water inlet means to the pump means;

shut off valve means coupled to the direct water inlet means for selectively opening and closing the direct water inlet means; and engine means mounted on the platform and connected to the pump means for driving the pump means.

2. An apparatus according to claim 1 wherein the platform comprises a trailer with wheels and a towing hitch.

3. An apparatus according to claim 2 including hose means connected to the suction inlet and hose support means on the trailer for carrying the hose means thereon.

* * * * *